United States Patent
Yokoyama et al.

(10) Patent No.: US 9,541,757 B2
(45) Date of Patent: Jan. 10, 2017

(54) LIGHT FLUX DIAMETER-EXPANDING ELEMENT AND DISPLAY APPARATUS

(71) Applicant: Seiko Epson Corporation, Tokyo (JP)

(72) Inventors: Osamu Yokoyama, Shiojiri (JP); Masatoshi Yonekubo, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/937,758

(22) Filed: Nov. 10, 2015

(65) Prior Publication Data
US 2016/0139407 A1 May 19, 2016

(30) Foreign Application Priority Data
Nov. 17, 2014 (JP) .................................. 2014-232437

(51) Int. Cl.
G02B 26/08 (2006.01)
G02B 27/00 (2006.01)
G02B 27/42 (2006.01)
G02B 27/01 (2006.01)

(52) U.S. Cl.
CPC ....... *G02B 27/0081* (2013.01); *G02B 27/0172* (2013.01); *G02B 27/4277* (2013.01); *G02B 2027/0123* (2013.01)

(58) Field of Classification Search
CPC ............ G02B 27/0172; G02B 27/4272; G02B 2027/0123; G02B 27/0081; G02B 27/4277
USPC ....................................... 359/207.7, 566, 569
See application file for complete search history.

(56) References Cited

U.S. PATENT DOCUMENTS

| 5,742,262 A | 4/1998 | Tabata et al. |
| 2014/0204438 A1* | 7/2014 | Yamada ............. G02B 27/0172 359/32 |

FOREIGN PATENT DOCUMENTS

| JP | 07-072422 A | 3/1995 |
| JP | 2010-085785 A | 4/2010 |

* cited by examiner

*Primary Examiner* — James Phan
(74) *Attorney, Agent, or Firm* — ALG Intellectual Property, LLC

(57) ABSTRACT

A light flux diameter-expanding element (pupil expanding element) which is used in a retina scanning type display apparatus includes a first diffraction grating having a grating pattern extending in a first direction X, a second diffraction grating, a third diffraction grating, and a fourth diffraction grating, and expands a diameter of the incident light flux in a second direction Y so as to emit the light. In addition, the light flux diameter-expanding element includes a fifth diffraction grating having a grating pattern extending in the second direction Y, a sixth diffraction grating, a seventh diffraction grating, and an eighth diffraction grating, and expands a diameter of the incident light flux in the first direction X so as to emit the light.

20 Claims, 8 Drawing Sheets

LIGHT FLUX DIAMETER-EXPANDING ELEMENT AND DISPLAY APPARATUS

BACKGROUND

1. Technical Field

The present invention relates to a light flux diameter-expanding element which expands a light flux diameter, and a display apparatus which makes light-modulated light flux be incident on the eyes of a user.

2. Related Art

In a retina scanning type display apparatus which makes light-modulated light flux be incident on the eyes of a user, a light source portion which emits light flux for displaying an image, a scanning optical system which applies the light flux emitted from the light source portion in two directions, and a light guide system which reflects the light flux applied by the scanning optical system and makes the light flux be incident on the eyes of user, are provided. In addition, in the retina scanning type display apparatus, when the light flux is small, the light flux is not incident on a pupil in a case in which a position of the pupil is changed, therefore, a defect of the image, and the like are generated. Here, a light flux diameter-expanding element (pupil expanding element) is provided in the retina scanning type display apparatus.

Meanwhile, as the light flux diameter-expanding element (pupil expanding element), a light flux diameter-expanding element has been proposed in which two diffraction gratings (first diffraction grating and second diffraction grating) face each other and diffraction angles thereof are coincident with each other by making both grating periods thereof be equal to each other (refer to JP-A-7-72422).

However, in a configuration in which the two diffraction gratings (first diffraction grating and second diffraction grating) face each other, there are problems which will be described later with reference to FIG. 10. In FIG. 10, diffraction light which is emitted in parallel to incident light flux L0 is illustrated, and emission light beams (+1-st order diffraction light, 0-th order diffraction light, and −1-st order diffraction light) emitted from a first diffraction grating 11 are emitted in parallel to each other with intervals of 3 mm therebetween as respectively −1-st order diffraction light, 0-th order diffraction light, and +1-st order diffraction light in a second diffraction grating 12, for example. For this reason, light flux L1 including the −1-st order diffraction light, the 0-th order diffraction light, and the +1-st order diffraction light emitted from the second diffraction grating 12 has a diameter of 6 mm. Accordingly, when a diameter of a pupil E1 is set to 2 mm, eyes E can see an image even when the eyes are moved in a range of total 8 mm in which each radius of 1 mm of the pupil E1 is respectively added to both sides of the diameter of 6 mm of the light flux L1. That is, since the outermost light beam is incident on the pupil E1 even when the eyes E are positioned at a position PA or a position PC, the eyes can see the image. However, in a configuration illustrated in FIG. 10, since intervals between the −1-st order diffraction light, the 0-th order diffraction light, and the +1-st order diffraction light are wide and may be respectively 3 mm, if the eyes E is positioned at a position PB between the 0-th order diffraction light and the +1-st order diffraction light, there is a problem in that the light flux L1 is not incident on the pupil E1, such that it is not possible for the eyes to see the image.

SUMMARY

An advantage of some aspects of the invention is to provide a light flux diameter-expanding element which is possible to appropriately narrow intervals of each of finally emitted diffraction light beams even when the light flux diameter is expanded using a diffraction grating, and a display apparatus which uses the light flux diameter-expanding element.

According to an aspect of the invention, there is provided a light flux diameter-expanding element including a first diffraction grating that is provided with concave portions or convex portions extending in a first direction, which are periodically arranged, a second diffraction grating that is disposed opposite to the first diffraction grating, and is provided with concave portions or convex portions extending in the first direction, which are periodically arranged, a third diffraction grating that is disposed at a side opposite to the first diffraction grating with respect to the second diffraction grating in a facing manner, and is provided with concave portions or convex portions extending in the first direction, which are periodically arranged, and a fourth diffraction grating that is disposed at a side opposite to the second diffraction grating with respect to the third diffraction grating in a facing manner, and is provided with concave portions or convex portions extending in the first direction, which are periodically arranged, and in which the first diffraction grating, the second diffraction grating, the third diffraction grating, and the fourth diffraction grating are disposed so that grating periods of the concave portions or the convex portions are respectively same.

According to the invention, the diffraction light emitted from the first diffraction grating are respectively added to a second diffraction element, and emitted by being diffracted from a third diffraction element and a fourth diffraction element. For this reason, the diameter of the incident light flux can be expanded in the second direction intersecting the first direction, and the expanded light flux can be emitted from the fourth diffraction element, thereby making it possible to appropriately narrow an interval in the second direction of each of the diffraction light emitted in parallel from the fourth diffraction element.

In the invention, it is preferable that the diffraction gratings are disposed, so that an interval between the first diffraction grating and the second diffraction grating is different from an interval between the third diffraction grating and the fourth diffraction grating. According to the above described configuration, an emission position in the second direction each of the diffraction light finally emitted can be appropriately set.

In the invention, a first light transmissive substrate may be disposed between two adjacent diffraction gratings of the first diffraction grating, the second diffraction grating, the third diffraction grating, and the fourth diffraction grating. According to the above described configuration, since the diffraction gratings are formed on one surface and the other surface of the first light transmissive substrate, the number of light transmissive substrates may be reduced. Thus, it is possible to realize thinning of the light flux diameter-expanding element.

In the invention, a first light transmissive substrate may be disposed between the first diffraction grating and the second diffraction grating, and a second light transmissive substrate may be disposed between the third diffraction grating and the fourth diffraction grating. According to the above described configuration, since the diffraction gratings are formed on one surface and the other surface of the first light transmissive substrate and the second light transmissive substrate, the number of light transmissive substrates may be reduced. Thus, it is possible to realize thinning of the light flux diameter-expanding element.

In the invention, it is preferable that the light flux diameter-expanding element further includes a fifth diffraction grating that is provided with concave portions or convex portions extending in a second direction intersecting the first direction, which are periodically arranged, a sixth diffraction grating that is disposed opposite to the fifth diffraction grating, and is provided with concave portions or convex portions extending in the second direction, which are periodically arranged, a seventh diffraction grating that is disposed at a side opposite to the fifth diffraction grating with respect to the sixth diffraction grating in a facing manner, and is provided with concave portions or convex portions extending in the second direction, which are periodically arranged, and an eighth diffraction grating that is disposed at a side opposite to sixth diffraction grating with respect to the seventh diffraction grating in a facing manner, and is provided with concave portions or convex portions extending in the second direction, which are periodically arranged, and that the fifth diffraction grating, the sixth diffraction grating, the seventh diffraction grating, and the eighth diffraction grating are disposed so that grating periods of the concave portions or the convex portions are respectively same. According to the above described configuration, the diffraction light emitted from the fifth diffraction grating are respectively added to a sixth diffraction element, and emitted by being diffracted from a seventh diffraction element and a eighth diffraction element. For this reason, the diameter of incident light flux can be expanded in the first direction, and the expanded light flux can be emitted from the eighth diffraction element, thereby making it possible to make an interval appropriately narrow in the first direction of each of the diffraction light emitted in parallel from the eighth diffraction element.

In the invention, it is preferable that the diffraction gratings are disposed so that an interval between the fifth diffraction grating and the sixth diffraction grating is different from an interval between the seventh diffraction grating and the eighth diffraction grating. According to the above described configuration, an emission position in the first direction of the diffraction light finally emitted can be appropriately set.

In the invention, it is preferable that the first diffraction grating and the fifth diffraction grating are disposed so that grating periods of the concave portions or the convex portions are respectively same.

According to another aspect of the invention, there is provided a light flux diameter-expanding element including a first diffraction grating that is provided with concave portions or convex portions, which are periodically arranged in a first direction and a second direction intersecting the first direction, a second diffraction grating that is disposed on the first diffraction grating in a facing manner, and is provided with concave portions or convex portions, which are periodically arranged in the first direction and the second direction, a third diffraction grating that is disposed at a side opposite to the first diffraction grating with respect to the second diffraction grating in a facing manner, and is provided with concave portions or convex portions, which are periodically arranged in the first direction and the second direction, and a fourth diffraction grating that is disposed at a side opposite to the second diffraction grating with respect to the third diffraction grating, and is provided with concave portions or convex portions, which are periodically arranged in the first direction and the second direction, and in which the first diffraction grating, the second diffraction grating, the third diffraction grating, and the fourth diffraction grating are disposed so as to have the same grating period along the first direction of the concave portions or the convex portions, respectively, and along the second direction of the concave portions or the convex portions, respectively.

According to the invention, the diffraction light emitted from the first diffraction grating is respectively added to a second diffraction element, and emitted by being diffracted from a third diffraction element and a fourth diffraction element. For this reason, the diameter of the incident light flux can be expanded in the first direction and the second direction, and the expanded light flux can be emitted from the fourth diffraction element, thereby making it possible to appropriately narrow an interval in the first direction of each of the diffraction lights emitted in parallel from the fourth diffraction element. In addition, since the diffraction light in each of the first diffraction grating, the second diffraction element, the third diffraction element, and the fourth diffraction element are diffracted in the first direction and the second direction, the number of diffraction gratings can be reduced. Thus, it is possible to realize thinning of the light flux diameter-expanding element.

According to still another aspect of the invention, there is provided a display apparatus which uses the light flux diameter-expanding element according to the above described aspect of the invention, the display apparatus including a light source that emits light flux, a scanning optical system that applies the light flux emitted from the light source and makes the applied light flux be an image, and a light guide system that make the light flux applied by the scanning optical system be incident on the eyes of a user, in which the light flux diameter-expanding element is disposed on a light path from the scanning optical system to the light guide system or a light path of the light guide system.

In the display apparatus according to the aspect of the invention, the light source may emit light of which an intensity distribution of a direction of a diameter of the light flux is Gaussian distribution, the light incident on the first diffraction grating may be emitted from the fourth diffraction grating through a second diffraction grating, the third diffraction grating, and the fourth diffraction grating, and the light emitted from the fourth diffraction grating may be light in which light having intensity greater than $1/e^2$ (e indicates the base of natural logarithm) times a peak value of the intensity of the light incident on the first diffraction grating is distributed so as to be continue in a direction of the diameter of the light flux.

In the display apparatus according to the aspect of the invention, it is preferable that the light guide system includes a relay lens system which is configured to have an afocal optical system on the light path from the scanning optical system to the light flux diameter-expanding element. According to the above described configuration, it is possible to downsize an optical element disposed backside further than the light flux diameter-expanding element.

In the display apparatus according to the aspect of the invention, it is preferable that a scanning mirror of the scanning optical system is disposed on a position of an entrance pupil of the optical system configured to have the light flux diameter-expanding element and the relay lens system, and that a final emitting surface of the light flux diameter-expanding element is disposed on a position of an exit pupil of the optical system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described.

Configuration of Retina Scanning Type Display Apparatus

Figure 1A:
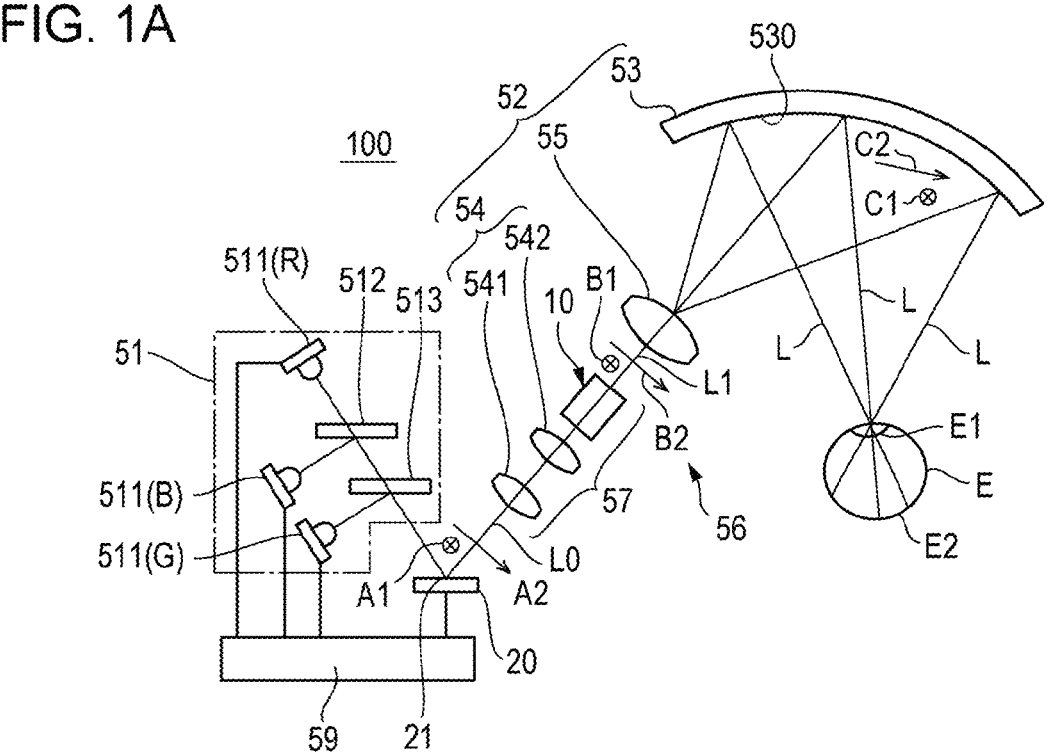
FIGS. 1A and 1B are explanatory diagrams illustrating an aspect of a retina scanning type display apparatus to which the invention is applied.
Figure 1B:
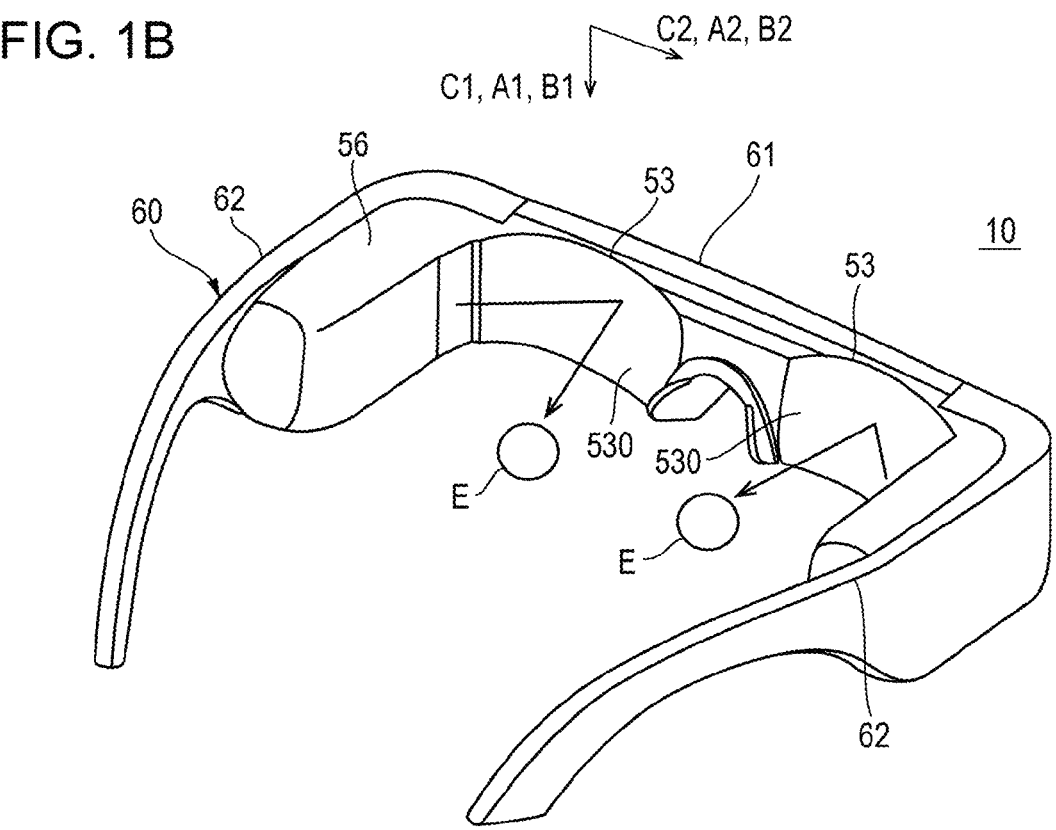
Figure 2A:
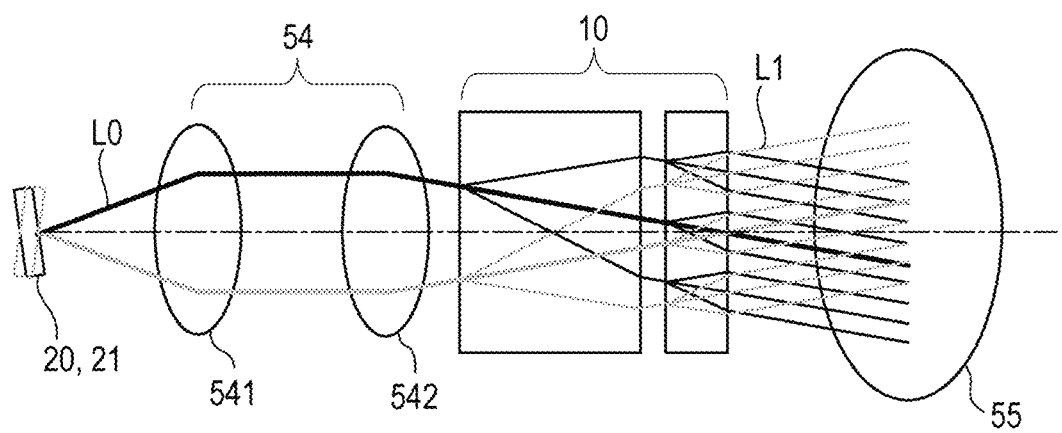
FIGS. 2A and 2B are explanatory diagrams illustrating an effect when using a relay lens system in the retina scanning type display apparatus to which the invention is applied.
Figure 2B:
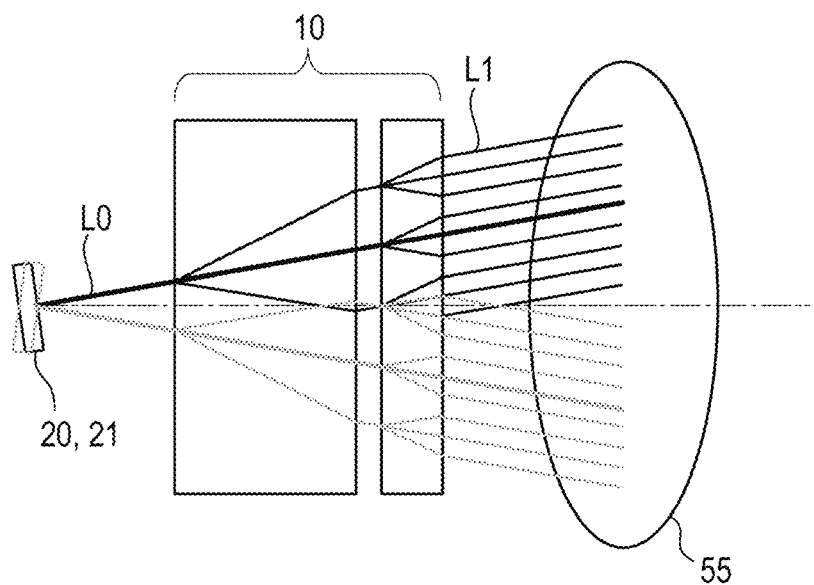

FIGS. 1A and 1B are explanatory diagrams illustrating an aspect of a retina scanning type display apparatus 100 to which the invention is applied. FIG. 1A is the explanatory diagram illustrating an aspect of an optical system, and FIG. 1B is the explanatory diagram illustrating an aspect of an exterior of the display apparatus 100. FIGS. 2A and 2B are explanatory diagrams illustrating an effect when using a relay lens system 54 in the retina scanning type display apparatus 100 to which the invention is applied. FIG. 2A is the explanatory diagram of light beam when using the relay lens system 54, and FIG. 2B is the explanatory diagram of the light beam when not using the relay lens system 54.

In FIG. 1A, the display apparatus 100 includes a light source portion 51 which emits light flux for displaying an image, a scanning optical system 20 including a scanning mirror 21 which applies the light flux emitted from the light source portion 51 so as to generate an image, and a light guide system 52 which makes the light flux L0 applied by the scanning optical system 20 be incident on eyes E of a user. In this embodiment, the light guide system 52 is configured to have a relay lens system 54, a projection lens system 55, and a reflection member 53, in a emission side of the scanning optical system 20.

The relay lens system 54 is configured to have, for example, two lenses 541 and 542. In the embodiment, the relay lens system 54 is configured as an afocal optical system.

The light source portion 51 emits light of light source before light-modulating, or modulated light which is light-modulated. In the embodiment, the light source portion 51 is configured as a modulated light emission portion which emits the modulated light, which is light-modulated. More specifically, the light source portion 51, as the light source, includes a red laser element 511(R) which emits the red light (R), a green laser element 511(G) which emits the green light (G), and a blue laser element 511(B) which emits the blue light (B), and also includes two half mirrors 512 and 513 which synthesize light paths of these laser elements. The red laser element 511(R), the green laser element 511(G), and the blue laser element 511(B) emit the light flux which is modulated to light intensity corresponding to each dot of the image to be displayed, under control of a control portion 59.

The scanning optical system 20 applies incident light in a first scanning direction A1 and a second scanning direction A2 intersecting the first scanning direction A1, and the applied light flux L0 is projected to the reflection member 53 through the relay lens system 54 and the projection lens system 55. An operation of the scanning optical system 20 described above is also performed under control of the control portion 59. The scanning optical system 20 can be realized, for example, by a micro mirror device which is formed by a technology of micro electro mechanical systems (MEMS) using a silicon substrate, or the like.

In the embodiment, the display apparatus 100 is configured as a projection display apparatus in a retina scanning method. For this reason, the reflection member 53 includes a reflection surface 530 having a concave curved surface shape, which reflects the projected light flux L0 and makes the reflected light be incident on the eyes E of the user as the light flux L. In the display apparatus 100 (projection display apparatus in retina scanning method), by the scanning optical system 20, the light flux L0 applied in the first scanning direction A1 and the second scanning direction A2 intersecting the first scanning direction A1 is reflected to the reflection surface 530 of the reflection member 53 in a first incident direction C1 corresponding to the first scanning direction A1 and a second incident direction C2 corresponding to the second scanning direction A2 through the pupil E1, and reaches a retina E2, such that the user recognizes the image. In the embodiment, the reflection member 53 is a combiner which partially transmits and reflects the light flux. For this reason, since the external light is also incident on the eyes through the reflection member 53 (combiner), the user can recognize an image obtained by overlapping of an image formed on the display apparatus 100 and the external light (background). That is, the display apparatus 100 is configured as a retina scanning type projection apparatus of a see-through type.

In addition, in the display apparatus 100, in the light path from the scanning optical system 20 to the reflection member 53 (light path from scanning optical system 20 to the light guide system 52, or light path of the light guide system 52), the light flux diameter-expanding element 10 which uses diffraction element to be described later is disposed. The light flux diameter-expanding element 10 expands the light flux emitted from the scanning optical system 20 in any one of a first expansion direction B1 corresponding to the first scanning direction A1 (first incident direction C1) and a second expansion direction B2 corresponding to the second scanning direction A2 (second incident direction C2).

In the embodiment, the light flux diameter-expanding element 10 may be disposed either on the light path from the scanning optical system 20 to the light guide system 52 or the light path of the light guide system 52; however, in the embodiment, the light flux diameter-expanding element 10 is disposed on the light path of the light guide system 52. More specifically, the light flux diameter-expanding element 10 is disposed between the lens 542 on an emission side of the relay lens system 54 and the projection lens system 55 in the light paths of the light guide system 52. Accordingly, the scanning mirror 21 of the scanning optical system 20 is disposed at a position of an entrance pupil of the optical system 57, which is configured to have the light flux diameter-expanding element 10 and the relay lens system 54, and the final emitting surface of the light flux diameter-expanding element 10 is disposed at a position of an exit pupil of the optical system 57.

When the display apparatus 100 having such a configuration is configured as a see-through type head mount display (eye glass display), as illustrated in FIG. 1B, the display apparatus 100 is formed to be glass-like shaped. In addition, when the modulated light is respectively incident on the right and left eyes E of an observer, the display apparatus 100 is provided with a frame 60 which supports the reflection member 53 for the right eye and the reflection member 53 for the left eye by a front part 61, and an optical unit 56 including optical components described with reference to FIG. 1A is provided on each of right and left temples 62 of the frame 60. Here, in an optical unit 56, all of the light source portion 51, the scanning optical system 20, the relay lens system 54, the light flux diameter-expanding element 10, and the projection lens system 55 are provided, in addition, in the optical unit 56, only the scanning optical system 20, the relay lens system 54, the light flux diameter-expanding element 10, and the projection lens system 55 are provided, and the optical unit 56 and the light source portion 51 may be connected to each other by an optical cable, and the like.

In the display apparatus 100 of the embodiment, in the image which is recognized by the user, the second incident direction C2 of the light flux L from the reflection member 53 corresponds to a traverse direction where the both eyes are arranged in parallel, and thus, the second scanning direction A2 in the scanning optical system 20 and the second expansion direction B2 in the light flux diameter-expanding element 10 correspond to a traverse direction of the image. In addition, the first incident direction C1 of the light flux L from the reflection member 53 corresponds to a longitudinal direction intersecting the traverse direction where the both eyes are arranged in parallel, and thus, the first scanning direction A1 in the scanning optical system 20 and the first expansion direction B1 in the light flux diameter-expanding element 10 correspond to the longitudinal direction of the image.

In the display apparatus 100 having such a configuration, the light flux L0 (laser beam) applied to the scanning mirror 21 is incident on the light flux diameter-expanding element 10 through the relay lens system 54, and the light flux L1 in which the light flux diameter is expanded in the light flux diameter-expanding element 10 is incident on the projection lens system 55. Here, since the relay lens system 54 emits the light flux which is parallel light as it is, it becomes the afocal optical system. Accordingly, as illustrated in FIG. 2A, it is considered that the light flux L1 in which the light flux diameter is expanded by the light flux diameter-expanding element 10 is applied around a point at which an emission surface of the light flux diameter-expanding element 10 and an optical axis intersect each other as the center, thereby making it possible to miniaturize the light flux diameter-expanding element 10 and the projection lens system 55. With respect to this, when the relay lens system 54 is not used, as illustrated in FIG. 2B, a rotation center of the applied light flux is a position of the scanning mirror 21, therefore, in the light flux diameter-expanding element 10, the light flux L0 and L1 are applied greatly, such that the light flux diameter-expanding element 10 and the projection lens system 55 become large. Thus, since the light flux diameter-expanding element 10 and the projection lens system 55 can be miniaturized using the relay lens system 54, as a result, when application is performed to the head mount display illustrated in FIG. 1B, a size thereof near a temporal part where the optical system is disposed can be miniaturized.

First Configuration Example of Light Flux Diameter-Expanding Element 10

Figure 3A:
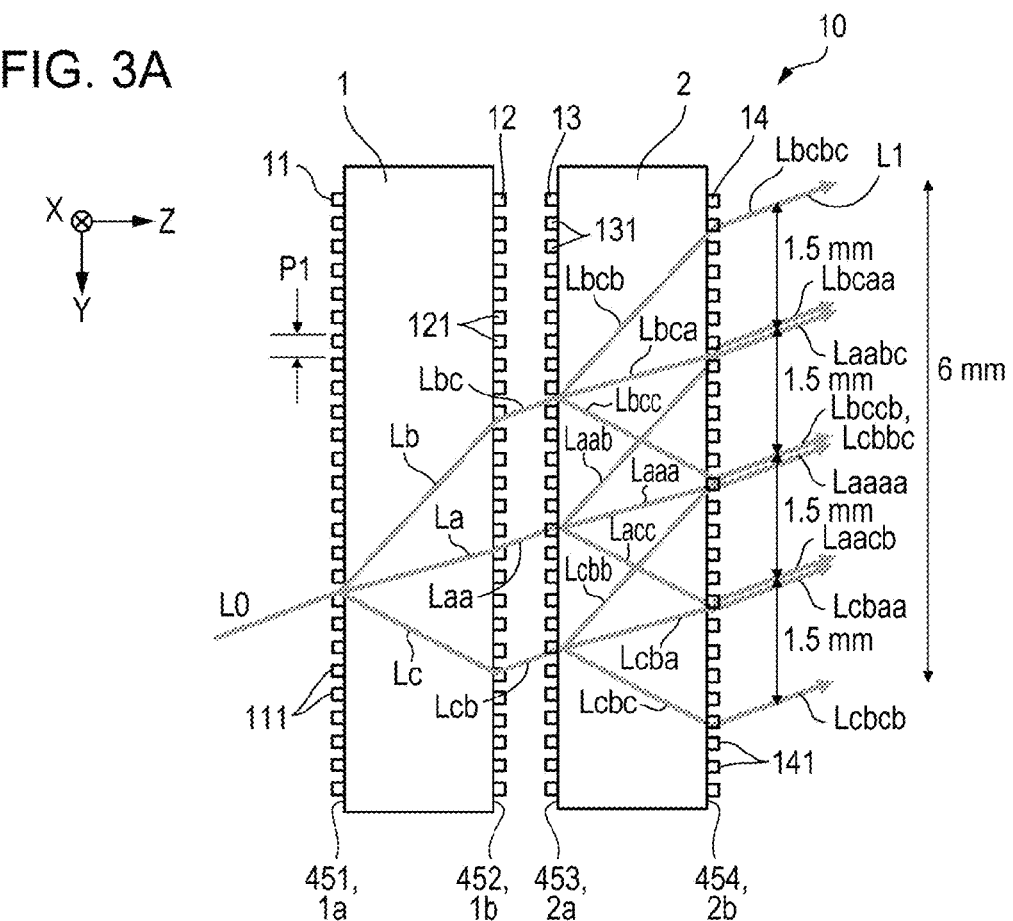
FIGS. 3A and 3B are explanatory diagrams illustrating an aspect of a first configuration example of a light flux diameter-expanding element (pupil expanding element) to which the invention is applied.
Figure 3B:
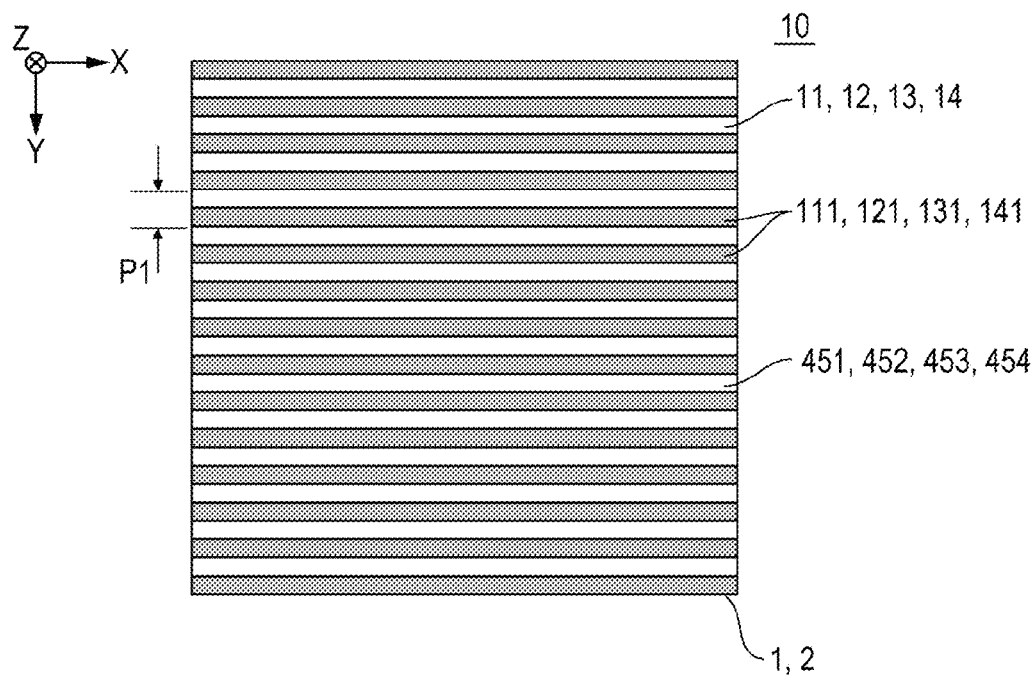

FIGS. 3A and 3B are explanatory diagrams illustrating an aspect of a first configuration example of the light flux diameter-expanding element 10 (pupil expanding element) to which the invention is applied. Moreover, FIGS. 3A and 3B illustrates only the laser beam emitted from the light flux diameter-expanding element 10 as the parallel light. In addition, in a description hereinafter, in a surface in which the diffraction grating is formed, in a surface intersecting an apparatus optical axis extending in a Z direction, a first direction is described as an X direction and a second direction is described as a Y direction in the first direction and the second direction which intersect each other. Here, the first direction X, for example, corresponds to a first expansion direction B1 (longitudinal direction) illustrated in FIGS. 1A and 1B, and the second direction Y corresponds to a second expansion direction (traverse direction) illustrated in FIGS. 1A and 1B.

As illustrated in FIGS. 3A and 3B, in the light flux diameter-expanding element 10 (pupil expanding element) which is described with reference to FIGS. 1A and 1B, the four diffraction gratings (first diffraction grating 11, second diffraction grating 12, third diffraction grating 13, and fourth diffraction grating 14) are disposed in a facing manner, and grating periods P1 in both directions are equal to each other so that the grating angles are coincident with each other.

More specifically, the light flux diameter-expanding element 10 of the embodiment includes a first diffraction grating 11 including a first grating pattern 111 which is configured to have a convex portion extending linearly in the first direction X in an in-plane direction of a first surface 451 intersecting the optical axis of the apparatus, and a second diffraction grating 12 including a second grating pattern 121 which is configured to have the convex portion extending linearly in the first direction X in an in-plane direction of a second surface 452 facing the first surface 451. In addition, the light flux diameter-expanding element 10 includes a third diffraction grating 13 including a third grating pattern 131 which is configured to have the convex portion extending linearly in the first direction X in an in-plane direction of a third surface 453 on a side opposite to the first surface 451 with respect to the second surface 452 in a facing manner, and a fourth diffraction grating 14 including a fourth grating pattern 141 which is configured to have the convex portion extending linearly in the first direction X in an in-plane direction of a fourth surface 454 on a side opposite to the second surface 452 with respect to the third surface 453 in a facing manner. Accordingly, the first diffraction grating 11 faces the second diffraction grating 12, the third diffraction grating 13 is disposed on a side opposite to the first diffraction grating 11 with respect to the second diffraction grating 12 in a facing manner, and the fourth diffraction grating 14 is disposed on a side opposite to the second diffraction grating 12 with respect to the third diffraction grating 13 in a facing manner. Here, the first grating pattern 111, the second grating pattern 121, the third grating pattern 131, and the fourth grating pattern 141 have the same grating period P1.

In the embodiment, a light transmissive substrate is disposed between the two adjacent diffraction gratings among the first diffraction grating 11, the second diffraction grating 12, the third diffraction grating 13, and the fourth diffraction grating 14. More specifically, one of two adjacent surfaces in an optical axis direction, among the first surface 451, the second surface 452, the third surface 453, and the fourth surface 454, is formed a first surface of the light transmissive substrate, and the other surface is formed on a second surface of the light transmissive substrate. In the embodiment, the first surface 451 is a first surface 1a of a first light transmissive substrate 1, and the second surface 452 is a second surface 1b of the first light transmissive substrate 1. The third surface 453 is a first surface 2a of a second light transmissive substrate 2, and the fourth surface 454 is a second surface 2b of the second light transmissive substrate 2. In addition, each of the first grating pattern 111, the second grating pattern 121, the third grating pattern 131, and the fourth grating pattern 141 is configured to have a film formed on the first light transmissive substrate 1 and the second light transmissive substrate 2. Moreover, each of the first grating pattern 111, the second grating pattern 121, the third grating pattern 131, and the fourth grating pattern 141 may be formed as a concave portion which is formed by etching, or the like with respect to the first light transmissive substrate 1 and the second light transmissive substrate 2.

Here, the first light transmissive substrate 1 and the second light transmissive substrate 2 are a light transmissive substrate having the same thickness. For this reason, an interval between the first surface 451 and the second surface 452 is equal to an interval between the third surface 453 and the fourth surface 454.

In the light flux diameter-expanding element 10 having such a configuration, when the light flux L0 is incident on the first diffraction grating 11, 0-th order diffraction light La, +1-st order diffraction light Lb, and −1-st order diffraction light Lc are generated, and such these diffraction light beams are incident on the second diffraction grating 12. Accordingly, in the second diffraction grating 12, 0-th order diffraction light Laa, +1-st order diffraction light (not illustrated), and −1-st order diffraction light (not illustrated) are generated from the 0-th order diffraction light La, 0-th order diffraction light (not illustrated), +1-st order diffraction light (not illustrated), and −1-st order diffraction light Lbc are generated from the +1-st order diffraction light Lb, and 0-th order diffraction light (not illustrated), the +1-st order diffraction light Lcb, and −1-st order diffraction light (not illustrated) are generated from the −1-st order diffraction light Lc. Such diffraction light beams are incident on the third diffraction grating 13. Accordingly, in the third diffraction grating 13, 0-th order diffraction light Laaa, +1-st order diffraction light Laab, and −1-st order diffraction light Laac are generated from the 0-th order diffraction light Laa, and 0-th order diffraction light Lbca, +1-st order diffraction light Lbcb, and −1-st order diffraction light Lbcc are generated from the −1-st order diffraction light Lbc, 0-th order diffraction light Lcba, +1-st order diffraction light Lcbb, and −1-st order diffraction light Lcbc are generated from the +1-st order diffraction light Lcb. Such diffraction light beams are incident on the fourth diffraction grating 14.

As a result, −1-st order diffraction light Lbcbc generated from the +1-st order diffraction light Lbcb is emitted from the fourth diffraction grating 14. In addition, 0-th order diffraction light Lbcaa generated from the 0-th order diffraction light Lbca and −1-st order diffraction light Laabc generated from the +1-st order diffraction light Laab are emitted from the fourth diffraction grating 14 by overlapping each other. In addition, +1-st order diffraction light Lbccb generated from the −1-st order diffraction light Lbcc, 0-th order diffraction light Laaaa generated from the 0-th order diffraction light Laaa, and −1-st order diffraction light Lcbbc generated from +1-st order diffraction light Lcbb are emitted from the fourth diffraction grating 14 by being overlapped each other. In addition, +1-st order diffraction light Laacb generated from the −1-st order diffraction light Laac and 0-th order diffraction light Lcbaa generated from the 0-th order diffraction light Lcba are emitted from the fourth diffraction grating 14 by being overlapped each other. In addition, +1-st order diffraction light Lcbcb generated from the −1-st order diffraction light Lcbc is emitted from the fourth diffraction grating 14.

Here, the light beams of the −1-st order diffraction light Lbcbc, the +1-st order diffraction light Lbcaa (−1-st order diffraction light Laabc), the +1-st order diffraction light Lbccb (0-th order diffraction light Laaaa and −1-st order diffraction light Lcbbc), the +1-st order diffraction light Laacb (0-th order diffraction light Lcbaa), and the +1-st order diffraction light Lcbcb are light beams which are proceeding in parallel from six places, which are separated from each other in the second direction Y, and the light flux L0 is emitted as the light flux L1 which is expanded up to a diameter of 6 mm in the second direction Y. When the diameter of the pupil E1 illustrated in FIGS. 1A and 1B is set to 2 mm, the eyes E can see an image even when the eyes E are moved in the second direction Y, in a range of total 8 mm in which a radius of 1 mm of the pupil E1 is respectively added to both side of a diameter of 6 mm of the light flux L1.

Figure 10:
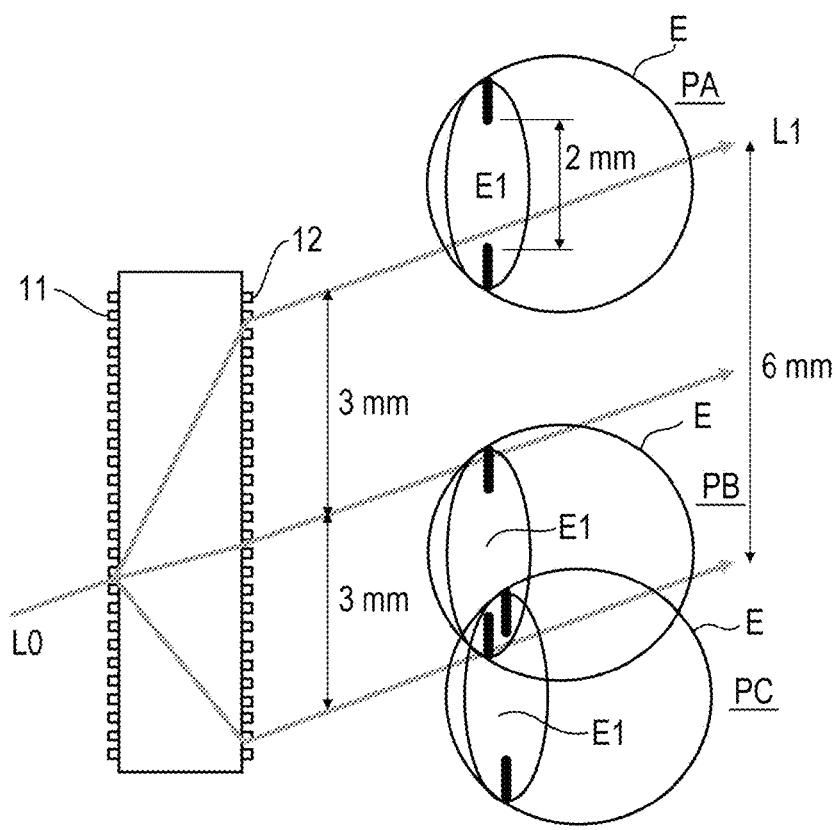
FIG. 10 is an explanatory diagram of the diffraction grating of the light flux diameter-expanding element (pupil expanding element) according to a reference example of the invention.

In addition, in the light flux L1, each of intervals of the diffraction light in the second direction Y is 1.5 mm, and in comparison to the configuration described with reference to FIG. 10, the intervals thereof are narrow. Accordingly, the eyes E can see the image even when the eyes E are positioned at the position PB illustrated in FIG. 10.

In addition, in the embodiment, the first surface 451 is the first surface 1a of the first light transmissive substrate 1, the second surface 452 is the second surface 1b of the first light transmissive substrate 1, the third surface 453 is the first surface 2a of the second light transmissive substrate 2, and the fourth surface 454 is the second surface 2b of the second light transmissive substrate 2. Accordingly, since the light flux diameter-expanding element 10 in which the diameter is expanded in the second direction Y can be configured to have the two light transmissive substrates (first light transmissive substrate 1 and second light transmissive substrate 2), the light flux diameter-expanding element 10 can be thinner and realized in low cost.

Second Configuration Example of Light Flux Diameter-Expanding Element 10

Figure 4:
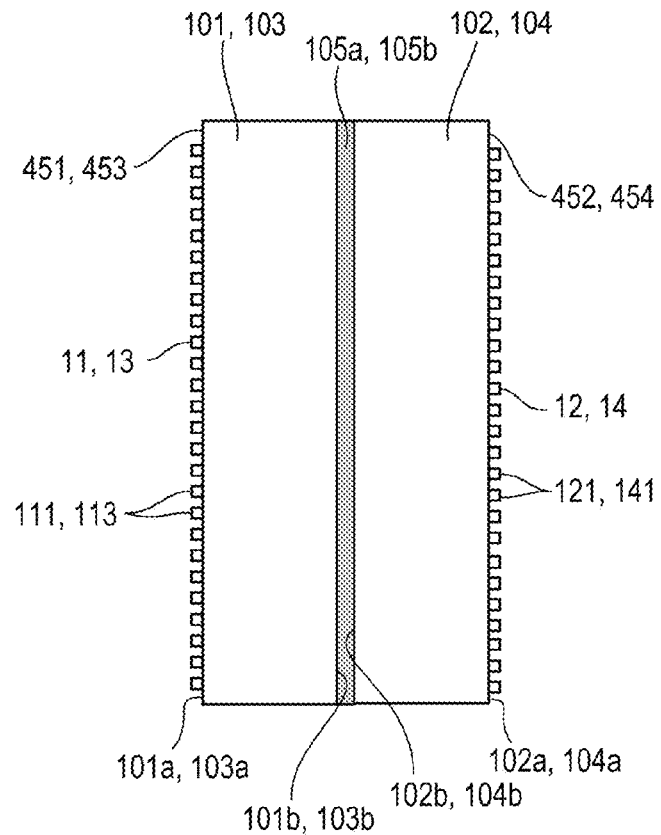
FIG. 4 is an explanatory diagram illustrating an aspect of a second configuration example of a light flux diameter-expanding element (pupil expanding element) to which the invention is applied.

FIG. 4 is an explanatory diagram of an aspect of a second configuration example of the light flux diameter-expanding element 10 (pupil expanding element) to which the invention is applied. Moreover, since a basic configuration of the embodiment and the configuration example to be described later is the same as the first configuration example, common parts thereof are given the same numerals, and thus, a description thereof will be omitted.

In the configuration example illustrated in FIGS. 3A and 3B, the first surface 451 and the second surface 452 are positioned on a substrate surface of the same light transmissive substrate, and the third surface 453 and the fourth surface 454 are also positioned on the substrate surface of the same light transmissive substrate; however, as illustrated in FIG. 4, each of the first surface 451, the second surface 452, the third surface 453, and the fourth surface 454 may be positioned on a substrate surface of a different light transmissive substrate. For example, the first surface 451 is positioned on a substrate surface 101a of one side of a first light transmissive substrate 101, and the second surface 452 is positioned on a substrate surface 102a of one side of a second light transmissive substrate 102. In addition, a surface 101b opposite to the substrate surface 101a of the first light transmissive substrate 1 and a surface 102b opposite to the substrate surface 102a of the second light transmissive substrate 102 are bonded to each other by an adhesive 105a having light transmissive properties. In addition, the third surface 453 is positioned on a substrate surface 103a of one side of the third light transmissive substrate 103, and a fourth surface 454 is positioned on a substrate surface 104a of one side of a fourth light transmissive substrate 104. In addition, a surface 103b opposite to the substrate surface 103a of the third light transmissive substrate 103 and a surface 104b opposite to the substrate surface 104a of the fourth light transmissive substrate 104 are bonded to each other by an adhesive 105b having light transmissive properties.

According to the described above configuration, when the grating pattern is formed, the grating pattern may be formed on the first surface of each of the light transmissive substrates, and therefore, a forming process of the grating pattern can be performed efficiently.

Third Configuration Example of Light Flux Diameter-Expanding Element 10

Figure 5:
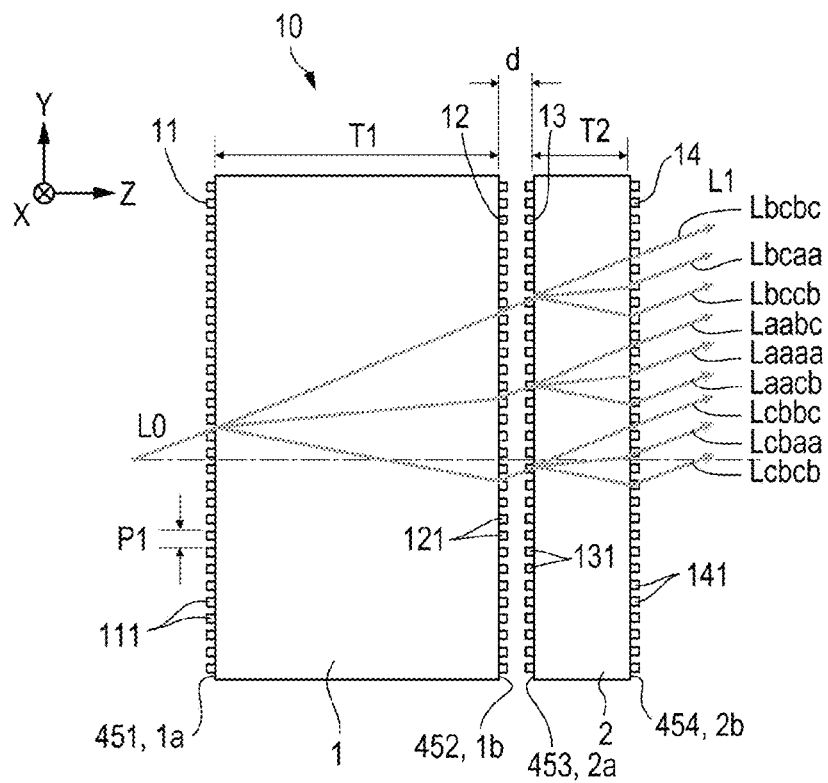
FIG. 5 is an explanatory diagram illustrating an aspect of a third configuration example of a light flux diameter-expanding element (pupil expanding element) to which the invention is applied.

FIG. 5 is an explanatory diagram illustrating an aspect of a third configuration example of the light flux diameter-expanding element 10 (pupil expanding element) to which the invention is applied. In the configuration examples 1 and 2 described with reference to FIGS. 3A to 4B, an interval between the first surface 451 and the second surface 452 is equal to an interval between the third surface 453 and the fourth surface 454; however, as illustrated in FIG. 5, in this example, the interval between the first surface 451 and the second surface 452 is different from the interval between the third surface 453 the fourth surface 454. For example, since a thickness T1 of the first light transmissive substrate 1 is greater than a thickness T2 of the second light transmissive substrate 2, the interval between the first surface 451 and the second surface 452 is wider than the interval between the third surface 453 and the fourth surface 454.

Accordingly, since an emission position in the second direction Y of each diffraction light finally emitted can be set appropriately, change in intensity of light in the second direction Y can be suppressed to be small.

For example, a glass having a refractive index of 1.52 is used as the first light transmissive substrate 1 and the second light transmissive substrate 2 so as to constitute a surface relief type diffraction grating, which has 1 µm grating period, as the first diffraction grating 11, the second diffraction grating 12, the third diffraction grating 13, and the fourth diffraction grating 14. At this time, the thickness T1 of the first light transmissive substrate 1 is set to 9 mm, the thickness T2 of the second light transmissive substrate 2 is set to 3 mm, and an interval d between the first light transmissive substrate 1 and the second light transmissive substrate 2 is set to 1 mm. As a result, when the light flux L0 incident at an incident angle of 10° is emitted as the light flux L1 in which the diameter in the second direction Y is expanded up to 6 mm, the light beams of the −1-st order diffraction light Lbcbc, the +1-st order diffraction light Lbcaa, the −1-st order diffraction light Laabc, the +1-st order diffraction light Lbccb, the 0-th order diffraction light Laaaa, the −1-st order diffraction light Lcbbc, the +1-st order diffraction light Laacb, the 0-th order diffraction light Lcbaa, and the +1-st order diffraction light Lcbcb are emitted as light beams which are proceeded in parallel from nine positions, which are separated from each other in the second direction Y. Here, when emission position coordinates of the nine positions are set to y1 to y9 by setting a position illustrated by a two-dotted chain line in FIG. 5 as an origin point, each of the emission position coordinate results are illustrated in Table. Moreover, Table illustrates the result of a case in which laser light of red light (638 nm), green light (520 nm), and blue light (450 nm) are incident, and a unit of the coordinate is mm.

TABLE

| Emission position | Incident laser wavelength | | |
| --- | --- | --- | --- |
| coordinate y | Red (638 nm) | Green (520 nm) | Blue (450 nm) |
| y9 | 8.46 | 7.04 | 6.28 |
| y8 | 6.91 | 5.84 | 5.28 |
| y7 | 5.60 | 4.80 | 4.38 |
| y6 | 3.81 | 3.46 | 3.27 |
| Y5 | 2.26 | 2.26 | 2.26 |
| y4 | 0.95 | 1.21 | 1.36 |
| y3 | −0.11 | 0.31 | 0.57 |
| y2 | −1.66 | −0.88 | −0.44 |
| y1 | −2.97 | −1.93 | −1.34 |

As seen from Table, the diffraction light emitted at an angle same as the incident light flux L0 can be emitted in a range of approximately 11.43 mm with intervals of approximately 1.06 mm to 1.79 mm in a case of the red light, can be emitted in a range of approximately 8.97 mm with intervals of approximately 0.90 mm to 1.34 mm in a case of the green light, and can be emitted in a range of approximately 7.62 mm with intervals of approximately 0.79 to 1.11 mm in a case of the blue light.

Fourth Configuration Example of Light Flux Diameter-Expanding Element 10

Figure 6A:
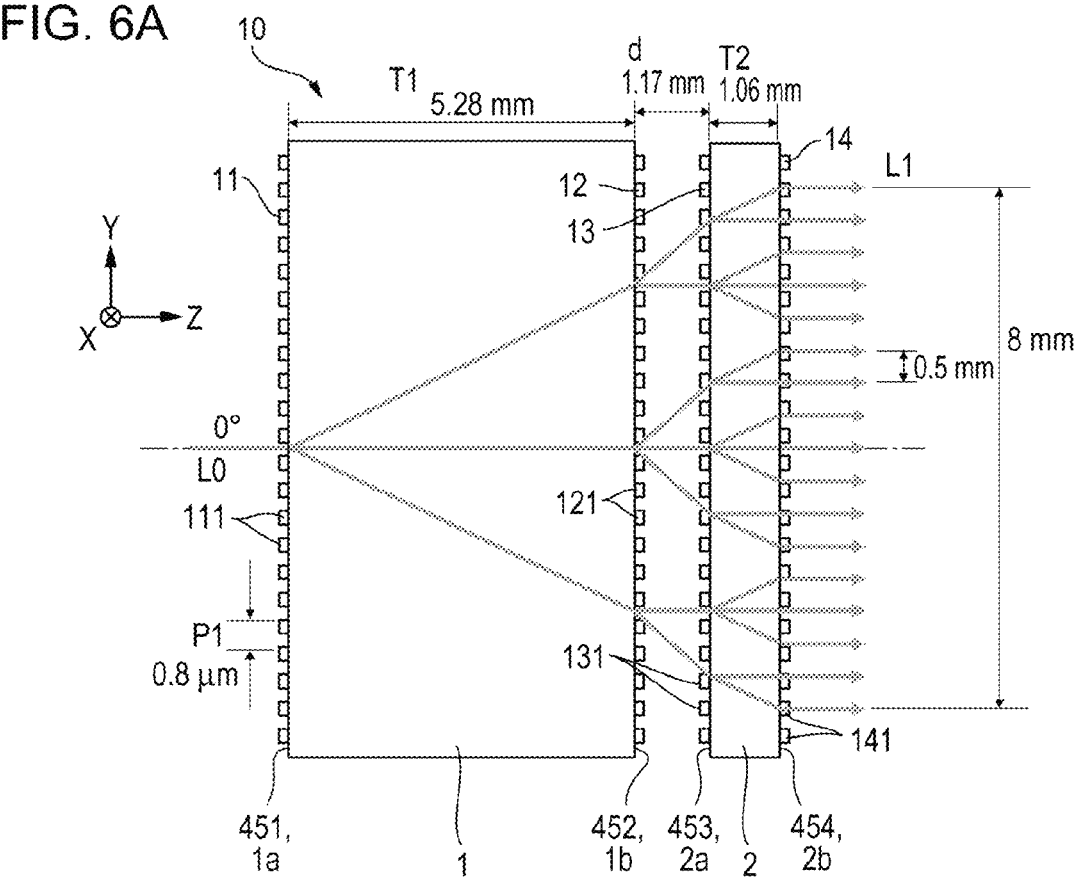
FIGS. 6A and 6B are explanatory diagrams illustrating an aspect of a fourth configuration example of a light flux diameter-expanding element (pupil expanding element) to which the invention is applied.
Figure 6B:
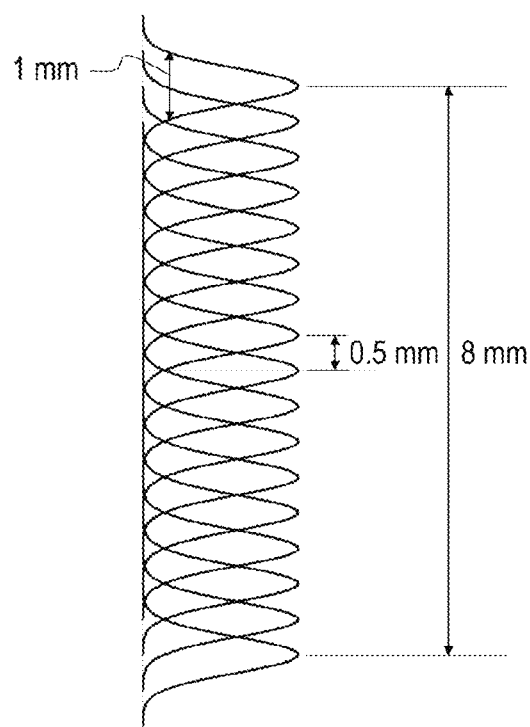

FIGS. 6A and 6B are explanatory diagrams illustrating an aspect of a fourth configuration example of the light flux diameter-expanding element 10 (pupil expanding element) to which the invention is applied. FIG. 6A is an explanatory diagram illustrating a configuration of the light flux diameter-expanding element 10, and FIG. 6B is an explanatory diagram illustrating a positional relationship of the diffraction light. In the embodiment, as illustrated in FIG. 5, by a combination of the 0-th order diffraction light, the +1-st order diffraction light, and the −1-st order diffraction light, as the light flux L1 including a laser beam in which an emission angle is equal to an incident angle of the incident light flux L0, in the second direction Y, intervals of the diffraction light of the green light which are adjacent each other in a range of 8 mm, are configured to be 0.5 mm. More specifically, a glass having a refractive index of 1.52 is used as the first light transmissive substrate 1 and the second light transmissive substrate 2, so as to constitute a surface relief type diffraction grating which has 0.8 µm grating period, as the first diffraction grating 11, the second diffraction grating 12, the third diffraction grating 13, and the fourth diffraction grating 14. At this time, the thickness T1 of the first light transmissive substrate 1 is set to 5.28 mm, the thickness T2 of the second light transmissive substrate 2 is set to 1.06 mm, and the interval d between the first light transmissive substrate 1 and the second light transmissive substrate 2 is set to 1.07 mm.

According to the above described configuration, in the light flux L1, the generation of a space where the light between the diffraction light barely exists can be suppressed. For example, the light source (red laser element 511(R), green laser element 511(G), and blue laser element 511(B)) illustrated in FIG. 1A generates light in which an intensity distribution in a direction of the diameter of the light flux is Gaussian distribution, as a result, an intensity distribution of the light flux L0 (laser beam) incident on the light flux diameter-expanding element 10 is Gaussian distribution, and a beam diameter, in which the intensity thereof is $1/e^2$ (e indicates the base of natural logarithm) times of a peak, is 1 mm. In this case, when 17 intervals of the diffraction light, which are adjacent each other in a degree of a range of 8 mm, are 0.5 mm, spaces between beams adjacent each other in the range of 8 mm can be filled with light. That is, the light emitted from the fourth diffraction grating 14 is light in which light having intensity greater than $1/e^2$ (e indicates the base of natural logarithm) times a peak value of the intensity of the light incident on the first diffraction grating 11 is distributed so as to continue in a direction of the diameter of the light flux.

Fifth Configuration of Light Flux Diameter-Expanding Element 10

Figure 7A:
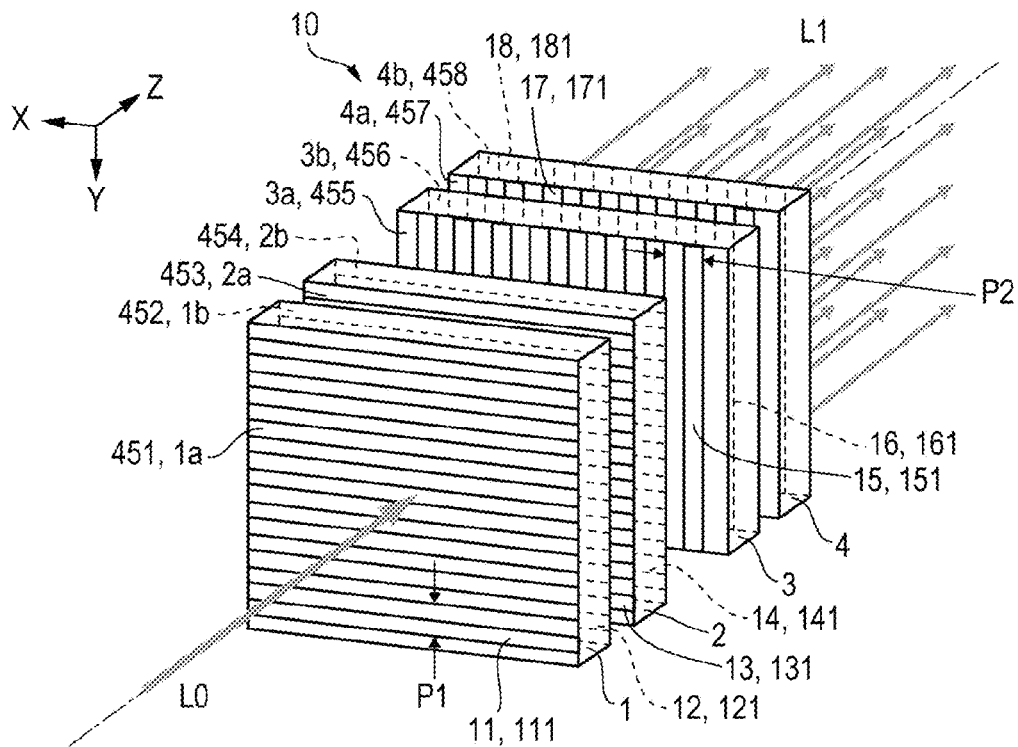
FIGS. 7A, 7B and 7C are explanatory diagrams illustrating an aspect of a fifth configuration example of a light flux diameter-expanding element (pupil expanding element) to which the invention is applied.
Figure 7B:
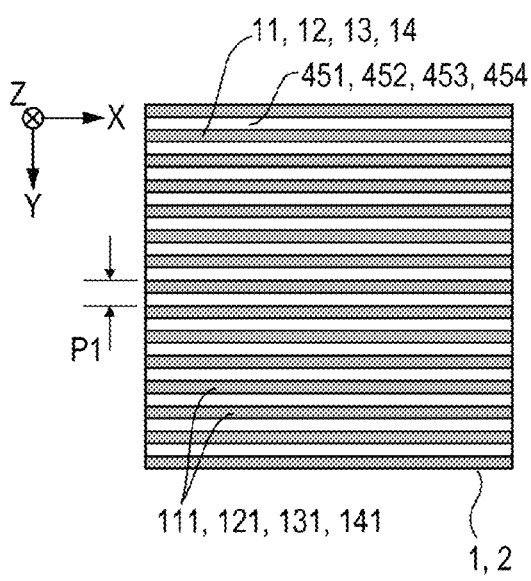
Figure 7C:
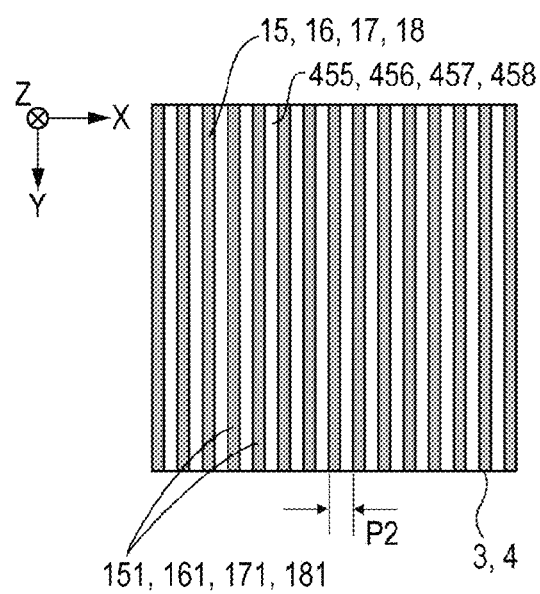

FIGS. 7A and 7C are explanatory diagrams of an aspect of a fifth configuration example of the light flux diameter-expanding element 10 (pupil expanding element) to which the invention is applied.

As illustrated in FIGS. 7A, 7B and 7C, the light flux diameter-expanding element 10 of the embodiment, in the same manner as Embodiment 1, includes the first diffraction grating 11 including the first grating pattern 111 which is configured to have a convex portion extending linearly in the first direction X in an in-plane direction of the first surface 451 intersecting an optical axis L, and the second diffraction grating 12 including the second grating pattern 121 which is configured to have the convex portion extending linearly in the first direction X in an in-plane direction of the second surface 452 facing the first surface 451. In addition, the light flux diameter-expanding element 10 includes the third diffraction grating 13 including the third grating pattern 131 which is configured to have the convex portion extending linearly in the first direction X in an in-plane direction of the third surface 453 on a side opposite to the first surface 451 with respect to the second surface 452 in a facing manner, and the fourth diffraction grating 14 including the fourth grating pattern 141 which is configured to have the convex portion extending linearly in the first direction X in an in-plan direction of the fourth surface 454 on a side opposite to the second surface 452 with respect to the third surface 453 in a facing manner. Accordingly, the first diffraction grating 11 faces the second diffraction grating 12, the third diffraction grating 13 is disposed on a side opposite to the first diffraction grating 11 with respect to the second diffraction grating 12 in a facing manner, and the fourth diffraction grating 14 is disposed on a side opposite to the second diffraction grating 12 with respect to the third diffraction grating 13 in a facing manner. Here, the first grating pattern 111, the second grating pattern 121, the third grating pattern 131, and the fourth grating pattern 141 have the same grating period P1.

In addition, the light flux diameter-expanding element 10 of the embodiment includes a fifth diffraction grating 15 including a fifth grating pattern 151 which is configured to have the convex portion extending linearly in the second direction Y in an in-plan direction of a fifth surface 455 intersecting the optical axis, and a sixth diffraction grating 16 including a sixth grating pattern 161 which is configured to have the convex portion extending linearly in the second direction Y in an in-plan direction of a sixth surface 456 facing the fifth surface 455. In addition, the light flux diameter-expanding element 10 includes a seventh diffraction grating 17 including a seventh grating pattern 171 which is configured to have the convex portion extending linearly in the second direction Y in an in-plan direction of a seventh surface 457 on a side opposite to the fifth surface 455 with respect to the sixth surface 456 in a facing manner, and an eighth diffraction grating 18 including an eighth grating pattern 181 which is configured to have the convex portion extending linearly in the second direction Y in an in-plan direction of an eighth surface 458 on a side opposite to the sixth surface 456 with respect to the seventh surface 457 in a facing manner. Accordingly, the fifth diffraction grating 15 faces the sixth diffraction grating 16, the seventh diffraction grating 17 is disposed on a side opposite to the fifth diffraction grating 15 with respect to the sixth diffraction grating 16 in a facing manner, and the eighth diffraction grating 18 is disposed on a side opposite to the sixth diffraction grating 16 with respect to the seventh diffraction grating 17 in a facing manner. Here, the fifth grating pattern 151, the sixth grating pattern 161, the seventh grating pattern 171, and the eighth grating pattern 181 have the same the grating period P2. In addition, in the embodiment, the grating periods P1 and P2 are the same. According to the light flux diameter-expanding element 10 having above described configuration, the diameter of the incident light flux L0 can be expanded in the first direction X and the second direction Y and emitted as the light flux L1.

In the embodiment, the fifth surface 455, the sixth surface 456, the seventh surface 457, and the eighth surface 458, are disposed on a side opposite to the first surface 451 with respect to the fourth surface 454.

In the embodiment, between the two adjacent diffraction gratings among the first diffraction grating 11, the second diffraction grating 12, the third diffraction grating 13, and the fourth diffraction grating 14, the light transmissive substrate is disposed. More specifically, among the first surface 451, the second surface 452, the third surface 453, and the fourth surface 454, one of two surfaces adjacent to each other in a direction of the optical axis L is formed on one surface of the light transmissive substrate, and the other is formed on the other surface of the light transmissive substrate. In addition, between the two adjacent diffraction gratings among the fifth diffraction grating 15, the sixth diffraction grating 16, the seventh diffraction grating 17, and the eighth diffraction grating 18, the light transmissive substrate is disposed. More specifically, among the fifth surface 455, the sixth surface 456, the seventh surface 457, and the eighth surface 458, one of two surfaces adjacent to each other in a direction of the optical axis is formed on one surface of the light transmissive substrate, and the other is formed on the other surface of the light transmissive substrate. More specifically, the first surface 451 is the first surface 1a of the first light transmissive substrate 1, and the second surface 452 is the second surface 1b of a first light transmissive substrate 1. The third surface 453 is the first surface 2a of a second light transmissive substrate 2, and the fourth surface 454 is the second surface 2b of the second light transmissive substrate 2. The fifth surface 455 is a first surface 3a of a third light transmissive substrate 3, and the sixth surface 456 is a second surface 3b of the third light transmissive substrate 3. The seventh surface 457 is a first surface 4a of a fourth light transmissive substrate 4, and the eighth surface 458 is a second surface 4b of the fourth light transmissive substrate 4. However, in the same manner as the second configuration example described with reference to FIG. 4, the fifth surface 455, the sixth surface 456, the seventh surface 457, and the eighth surface 458 may be a first surface of the different light transmissive substrate, respectively.

Here, the first light transmissive substrate 1 and the second light transmissive substrate 2 have the same thickness of the light transmissive substrate. For this reason, the interval between the first surface 451 and the second surface 452 is equal to the interval between the third surface 453 and the fourth surface 454. In addition, the third light transmissive substrate 3 and the fourth light transmissive substrate 4 have the same thickness. For this reason, an interval between the fifth surface 455 and the sixth surface 456 is equal to an interval between the seventh surface 457 and the eighth surface 458. However, in the same manner as the third configuration example and the fourth configuration example described with reference to FIGS. 5 to 6B, the thickness of the first light transmissive substrate 1 may be different from the thickness of the second light transmissive substrate 2, and the interval between the first surface 451 and the second surface 452 may be different from the interval between the third surface 453 and the fourth surface 454. In addition, the thickness of the third light transmissive substrate 3 may be different from the thickness of the fourth light transmissive substrate 4, and the interval between the fifth surface 455 and the sixth surface 456 may be different from the interval between the seventh surface 457 and the eighth surface 458. According to the above described configuration, in the same manner as the third configuration example and the fourth configuration example, even in either of the first direction X and the second direction Y, the emission position in the first direction X and the second direction Y of the finally emitted diffraction light can be appropriately set.

Sixth Configuration Example of Light Flux Diameter-Expanding Element 10

Figure 8:
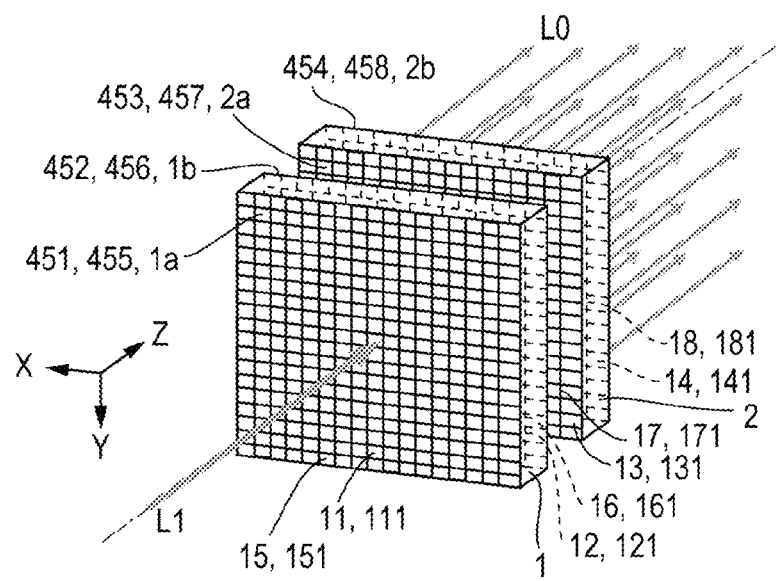
FIG. 8 is an explanatory diagram illustrating an aspect of a sixth configuration example of a light flux diameter-expanding element (pupil expanding element) to which the invention is applied.
Figure 9A:
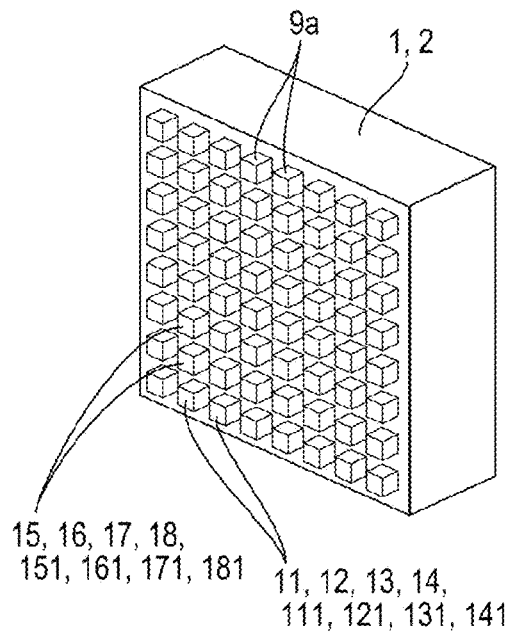
FIGS. 9A and 9B are explanatory diagrams of diffraction gratings of the light flux diameter-expanding element (pupil expanding element) illustrated in FIG. 8.
Figure 9B:
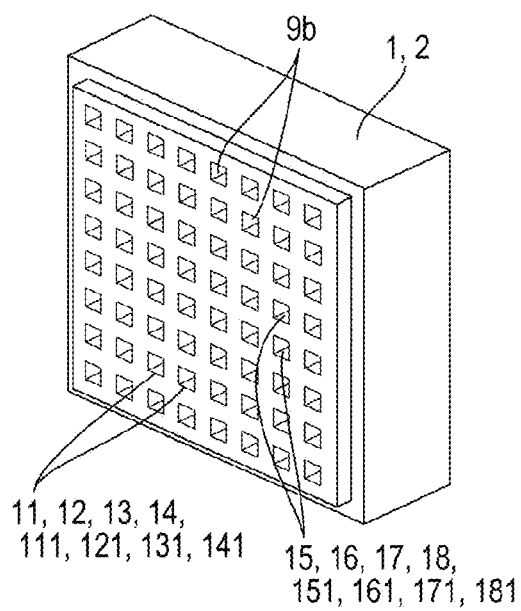

FIG. 8 is an explanatory diagram illustrating an aspect of the sixth configuration example of the light flux diameter-expanding element 10 (pupil expanding element) to which the invention is applied. FIGS. 9A and 9B are explanatory diagrams illustrating the diffraction grating of the light flux diameter-expanding element (pupil expanding element) illustrated in FIG. 8. FIG. 9A is an explanatory diagram of a convex shaped grating, and FIG. 9B is an explanatory diagram of a concave shaped grating.

As illustrated in FIG. 8, also in the light flux diameter-expanding element 10 of the embodiment, in the same manner as the seventh configuration example, eight of the first diffraction grating 11, the second diffraction grating 12, the third diffraction grating 13, the fourth diffraction grating 14, the fifth diffraction grating 15, the sixth diffraction grating 16, the seventh diffraction grating 17, and the eighth diffraction grating 18 face each other. In addition, in the first diffraction grating 11, the second diffraction grating 12, the third diffraction grating 13, and the fourth diffraction grating 14, the grating angles thereof are coincident with each other by making the grating periods P1 thereof be equal to each other. In addition, in the fifth diffraction grating 15, the sixth diffraction grating 16, the seventh diffraction grating 17, and the eighth diffraction grating 18, the grating angles thereof are coincident with each other by making the grating periods P2 thereof be equal to each other.

Here, any one of the first surface 451, the second surface 452, the third surface 453, and the fourth surface 454 becomes equal to any one of the fifth surface 455, the sixth surface 456, the seventh surface 457, and the eighth surface 458. In the embodiment, the first surface 451 and the fifth surface 455 are the same surface, the second surface 452 and the sixth surface 456 are the same surface, the third surface 453 and the seventh surface 457 are the same surface, and the fourth surface 454 and the eighth surface 458 are the same surface. Accordingly, the first surface 451 and the fifth surface 455 are the first surface 1a of the first light transmissive substrate 1, the second surface 452 and the sixth surface 456 are the second surface 1b of the first light transmissive substrate 1. The third surface 453 and the seventh surface 457 are the second surface 2a of the second light transmissive substrate 2, and the fourth surface 454 and the eighth surface 458 are the second surface 2b of the second light transmissive substrate 2. Accordingly, the first diffraction grating 11, the second diffraction grating 12, the fifth diffraction grating 15, and the sixth diffraction grating 16 are formed on the first light transmissive substrate 1, and the third diffraction grating 13, the fourth diffraction grating 14, the seventh diffraction grating 17, and the eighth diffraction grating 18 are formed on the second light transmissive substrate 2.

The light flux diameter-expanding element 10 of the configuration as described above, for example, as illustrated in FIG. 9A, can be configured to have convex portions 9a formed on a plurality of positions which have equal intervals (same period) in the first direction X and, equal intervals (same period) in the second direction Y with respect to a substrate surface of the first light transmissive substrate 1 or the second light transmissive substrate 2. Accordingly, also in any one the first diffraction grating 11, the second diffraction grating 12, the third diffraction grating 13, and the fourth diffraction grating 14, the convex portions 9a are periodically arranged in the first direction X and the second direction Y, and the first diffraction grating 11, the second diffraction grating 12, the third diffraction grating 13, and the fourth diffraction grating 14 respectively exert functions of the fifth diffraction grating 15, the sixth diffraction grating 16, the seventh diffraction grating 17, and the eighth diffraction grating 18.

In addition, as illustrated in FIG. 9B, the light flux diameter-expanding element 10 can be configured to have concave portions 9b formed on a plurality of positions which have the equal intervals in the first direction X and the equal intervals in the second direction Y with respect to the substrate surface of the first light transmissive substrate 1 and the second light transmissive substrate 2. Accordingly, also in any one of the first diffraction grating 11, the second diffraction grating 12, the third diffraction grating 13, and the fourth diffraction grating 14, the concave portions 9b are periodically arranged in the first direction X and the second direction Y, and the first diffraction grating 11, the second diffraction grating 12, the third diffraction grating 13, and the fourth diffraction grating 14 respectively function as the fifth diffraction grating 15, the sixth diffraction grating 16, the seventh diffraction grating 17, and the eighth diffraction grating 18.

In any of these cases, since the light flux diameter-expanding element 10 can be configured to have the two light transmissive substrates (first light transmissive substrate 1 and second light transmissive substrate 2), the light flux diameter-expanding element 10 can be thinner and realized in low cost. Here, in the configurations illustrated in FIGS. 9A and 9B, when considering balance between 1-st order diffracting efficiency and 0-th order diffracting efficiency, as illustrated in FIG. 9A, the diffraction grating which uses the convex portions 9a is preferable. Moreover, a flat surface shape of the convex portions 9a and the concave portions 9b is not limited to a quadrangle illustrated in FIGS. 9A and 9B, and may be a polygon having angles equal to or more than a triangle, or a pentagon, or may be a circle.

OTHER EMBODIMENT

In above described embodiments, the half mirror (reflection member 53) is used as the combiner of the light guide system 52; however, the invention may be applied to a display apparatus which uses a holographic optical element as the combiner.

The entire disclosure of Japanese Patent Application No. 2014-232437, filed Nov. 17, 2014 is expressly incorporated by reference herein.

What is claimed is:

1. A light flux diameter-expanding element comprising:
  a first diffraction grating that is provided with concave portions or convex portions extending in a first direction, which are periodically arranged;
  a second diffraction grating that is disposed opposite to the first diffraction grating, and is provided with concave portions or convex portions extending in the first direction, which are periodically arranged;
  a third diffraction grating that is disposed at a side opposite to the first diffraction grating with respect to the second diffraction grating in a facing manner, and is provided with concave portions or convex portions extending in the first direction, which are periodically arranged; and
  a fourth diffraction grating that is disposed at a side opposite to the second diffraction grating with respect to the third diffraction grating in a facing manner, and is provided with concave portions or convex portions extending in the first direction, which are periodically arranged,
  wherein the first diffraction grating, the second diffraction grating, the third diffraction grating, and the fourth diffraction grating are disposed so that grating periods of the concave portions or the convex portions are respectively same.

2. The light flux diameter-expanding element according to claim 1,
  wherein the diffraction gratings are disposed so that an interval between the first diffraction grating and the second diffraction grating is different from an interval between the third diffraction grating and the fourth diffraction grating.

3. A display apparatus comprising:
  the light flux diameter-expanding element according to claim 2;
  a light source that emits light flux;
  a scanning optical system that applies the light flux emitted from the light source and makes the applied light flux be an image; and
  a light guide system that make the light flux applied by the scanning optical system be incident on the eyes of a user,
  wherein the light flux diameter-expanding element is disposed on a light path from the scanning optical system to the light guide system or a light path of the light guide system.

4. The display apparatus according to claim 3,
  wherein the light source emits light of which an intensity distribution of a direction of a diameter of the light flux is Gaussian distribution,
  wherein the light incident on the first diffraction grating is emitted from the fourth diffraction grating through the second diffraction grating, the third diffraction grating, and the fourth diffraction grating, and
  wherein the light emitted from the fourth diffraction grating is light in which light having intensity greater than $1/e^2$ (e indicates the base of natural logarithm) times a peak value of the intensity of the light incident on the first diffraction grating is distributed so as to be continue in a direction of the diameter of the light flux.

5. The light flux diameter-expanding element according to claim 1,
  wherein a first light transmissive substrate is disposed between two adjacent diffraction gratings of the first diffraction grating, the second diffraction grating, the third diffraction grating, and the fourth diffraction grating.

6. A display apparatus comprising:
  the light flux diameter-expanding element according to claim 5;
  a light source that emits light flux;
  a scanning optical system that applies the light flux emitted from the light source and makes the applied light flux be an image; and
  a light guide system that make the light flux applied by the scanning optical system be incident on the eyes of a user,
  wherein the light flux diameter-expanding element is disposed on a light path from the scanning optical system to the light guide system or a light path of the light guide system.

7. The light flux diameter-expanding element according to claim 1,
  wherein a first light transmissive substrate is disposed between the first diffraction grating and the second diffraction grating, and a second light transmissive substrate is disposed between the third diffraction grating and the fourth diffraction grating.

8. A display apparatus comprising:
  the light flux diameter-expanding element according to claim 7;
  a light source that emits light flux;
  a scanning optical system that applies the light flux emitted from the light source and makes the applied light flux be an image; and
  a light guide system that make the light flux applied by the scanning optical system be incident on the eyes of a user,
  wherein the light flux diameter-expanding element is disposed on a light path from the scanning optical system to the light guide system or a light path of the light guide system.

9. The light flux diameter-expanding element according to claim 1, further comprising:
  a fifth diffraction grating that is provided with concave portions or convex portions extending in a second direction intersecting the first direction, which are periodically arranged;

a sixth diffraction grating that is disposed opposite to the fifth diffraction grating, and is provided with concave portions or convex portions extending in the second direction, which are periodically arranged;

a seventh diffraction grating that is disposed at a side opposite to the fifth diffraction grating with respect to the sixth diffraction grating in a facing manner, and is provided with concave portions or convex portions extending in the second direction, which are periodically arranged; and an eighth diffraction grating that is disposed at a side opposite to sixth diffraction grating with respect to the seventh diffraction grating in a facing manner, and is provided with concave portions or convex portions extending in the second direction, which are periodically arranged, wherein the fifth diffraction grating, the sixth diffraction grating, the seventh diffraction grating, and the eighth diffraction grating are disposed so that grating periods of the concave portions or the convex portions are respectively same.

10. The light flux diameter-expanding element according to claim 9, wherein the diffraction gratings are disposed so that an interval between the fifth diffraction grating and the sixth diffraction grating is different from an interval between the seventh diffraction grating and the eighth diffraction grating.

11. A display apparatus comprising:

the light flux diameter-expanding element according to claim 10;

a light source that emits light flux;

a scanning optical system that applies the light flux emitted from the light source and makes the applied light flux be an image; and a light guide system that make the light flux applied by the scanning optical system be incident on the eyes of a user, wherein the light flux diameter-expanding element is disposed on a light path from the scanning optical system to the light guide system or a light path of the light guide system.

12. The light flux diameter-expanding element according to claim 9, wherein the first diffraction grating and the fifth diffraction grating are disposed so that grating periods of the concave portions or the convex portions are respectively same.

13. A display apparatus comprising:

the light flux diameter-expanding element according to claim 12;

a light source that emits light flux;

a scanning optical system that applies the light flux emitted from the light source and makes the applied light flux be an image; and a light guide system that make the light flux applied by the scanning optical system be incident on the eyes of a user, wherein the light flux diameter-expanding element is disposed on a light path from the scanning optical system to the light guide system or a light path of the light guide system.

14. A display apparatus comprising:

the light flux diameter-expanding element according to claim 9;

a light source that emits light flux;

a scanning optical system that applies the light flux emitted from the light source and makes the applied light flux be an image; and a light guide system that make the light flux applied by the scanning optical system be incident on the eyes of a user, wherein the light flux diameter-expanding element is disposed on a light path from the scanning optical system to the light guide system or a light path of the light guide system.

15. A display apparatus comprising:

the light flux diameter-expanding element according to claim 1;

a light source that emits light flux;

a scanning optical system that applies the light flux emitted from the light source and makes the applied light flux be an image; and a light guide system that make the light flux applied by the scanning optical system be incident on the eyes of a user, wherein the light flux diameter-expanding element is disposed on a light path from the scanning optical system to the light guide system or a light path of the light guide system.

16. The display apparatus according to claim 15, wherein the light source emits light of which an intensity distribution of a direction of a diameter of the light flux is Gaussian distribution, wherein the light incident on the first diffraction grating is emitted from the fourth diffraction grating through the second diffraction grating, the third diffraction grating, and the fourth diffraction grating, and wherein the light emitted from the fourth diffraction grating is light in which light having intensity greater than $1/e^2$ (e indicates the base of natural logarithm) times a peak value of the intensity of the light incident on the first diffraction grating is distributed so as to be continue in a direction of the diameter of the light flux.

17. The display apparatus according to claim 15, wherein the light guide system includes a relay lens system which is configured to have an afocal optical system on a light path from the scanning optical system to the light flux diameter-expanding element.

18. The display apparatus according to claim 17, wherein a scanning mirror of the scanning optical system is disposed on a position of an entrance pupil of the optical system configured to have the light flux diameter-expanding element and the relay lens system, and a final emitting surface of the light flux diameter-expanding element is disposed at a position of an exit pupil of the optical system.

19. A light flux diameter-expanding element comprising:

a first diffraction grating that is provided with concave portions or convex portions, which are periodically arranged in a first direction and a second direction intersecting the first direction;

a second diffraction grating that is disposed opposite to the first diffraction grating, and is provided with concave portions or convex portions, which are periodically arranged in the first direction and the second direction;

a third diffraction grating that is disposed at a side opposite to the first diffraction grating with respect to the second diffraction grating in a facing manner, and is provided with concave portions or convex portions, which are periodically arranged in the first direction and the second direction; and a fourth diffraction grating that is disposed at a side opposite to the second diffraction grating with respect to the third diffraction grating in a facing manner, and is provided with concave portions or convex portions, which are periodically arranged in the first direction and the second direction, wherein the first diffraction grating, the second diffraction grating, the third diffraction grating, and the fourth diffraction grating are disposed so as to have the same grating period along the first direction of the concave portions or the convex portions, respectively, and along the second direction of the concave portions or the convex portions, respectively.

20. A display apparatus comprising:

the light flux diameter-expanding element according to claim 19;

a light source that emits light flux;

a scanning optical system that applies the light flux emitted from the light source and makes the applied light flux be an image; and a light guide system that make the light flux applied by the scanning optical system be incident on the eyes of a user, wherein the light flux diameter-expanding element is disposed on a light path from the scanning optical system to the light guide system or a light path of the light guide system.

* * * * *